United States Patent [19]
Mozer

[11] Patent Number: 5,071,049
[45] Date of Patent: Dec. 10, 1991

[54] MOBILE TELEPHONE CONSOLE

[75] Inventor: Reinhold J. Mozer, Bloomfield Hills, Mich.

[73] Assignee: Mozer Leasing Inc., Rochester Hills, Mich.

[21] Appl. No.: 252,744

[22] Filed: Oct. 3, 1988

[51] Int. Cl.⁵ .............................................. B60R 11/02
[52] U.S. Cl. .................... 224/277; 224/42.42; 248/224.3; 248/447; 379/438; 379/446; 379/455
[58] Field of Search ............ 224/275, 276, 277, 42.42, 224/42.43, 42.44; 455/90, 345, 346; 434/112; 108/44, 45; 379/58, 59, 435, 436, 438, 441, 445, 446, 455; 340/407; 116/DIG. 17; 248/51, 52, 224.3, 447, 240.4; 68/6; D14/138, 251

[56] References Cited

U.S. PATENT DOCUMENTS

| | | | |
|---|---|---|---|
| D. 189,781 | 2/1961 | Barkin | D26/14 |
| D. 216,641 | 2/1970 | Phillips | D26/14 |
| D. 280,098 | 8/1985 | McGarvey | D14/60 |
| 585,427 | 6/1897 | Burns | 248/240.4 |
| 809,670 | 1/1906 | Covert | 248/224.3 X |
| 2,912,513 | 11/1959 | Robinson et al. | 379/436 |
| 3,136,461 | 8/1962 | Gregg, Jr., | 224/42.42 |
| 3,163,287 | 6/1963 | Barnett | 206/19.5 |
| 3,305,200 | 2/1967 | Avery | 248/224.3 X |
| 3,311,276 | 3/1967 | Fromm | 224/29 |
| 3,356,409 | 9/1967 | Belsky et al. | 296/24 |
| 3,515,816 | 4/1968 | Laing | 179/100 |
| 3,550,001 | 12/1970 | Hanley | 224/42.42 |
| 3,561,589 | 2/1971 | Larkin, Jr. et al. | 206/19.5 |
| 3,632,158 | 1/1972 | Boothe | 224/275 X |
| 3,776,389 | 12/1973 | Waldecker | 211/90 |
| 3,804,233 | 4/1974 | Gregg, Jr. | 206/19.5 R |
| 3,845,252 | 10/1974 | Wooters | 179/146 R |
| 3,984,161 | 10/1976 | Johnson | 312/254 X |
| 4,061,971 | 12/1977 | Barrons | 325/15 |
| 4,543,451 | 9/1985 | Schoen | 179/2 EA |
| 4,560,831 | 12/1985 | Bast et al. | 379/434 X |
| 4,611,734 | 9/1986 | Luecking et al. | 224/42.42 |
| 4,640,542 | 2/1987 | Watjer | 312/319 X |
| 4,646,344 | 2/1987 | Goldhorn et al. | 379/58 |
| 4,723,281 | 2/1988 | Peiker et al. | 379/433 |
| 4,741,033 | 4/1988 | Utoh et al. | 379/435 |
| 4,842,174 | 6/1989 | Sheppard et al. | 224/273 |

FOREIGN PATENT DOCUMENTS 2545308 4/1977 Fed. Rep. of Germany ...... 224/275

Primary Examiner—Henry J. Recla
Assistant Examiner—Robert M. Fetsuga
Attorney, Agent, or Firm—Reising, Ethington, Barnard, Perry & Milton

[57] ABSTRACT

A mobile telephone console for use in a motor vehicle includes arcuate side shoulders on an upper surface supporting the telephone to guide the hand of the user to the telephone to release it from the telephone cradle. The console may have a writing table assembly removably connected thereto by a stab joint arrangement between an elongate table support arm and a slot in the console. The writing table is pivotable on the support arm between a deploying position for use by the driver or a storage position when the table assembly is removed from the console.

39 Claims, 4 Drawing Sheets

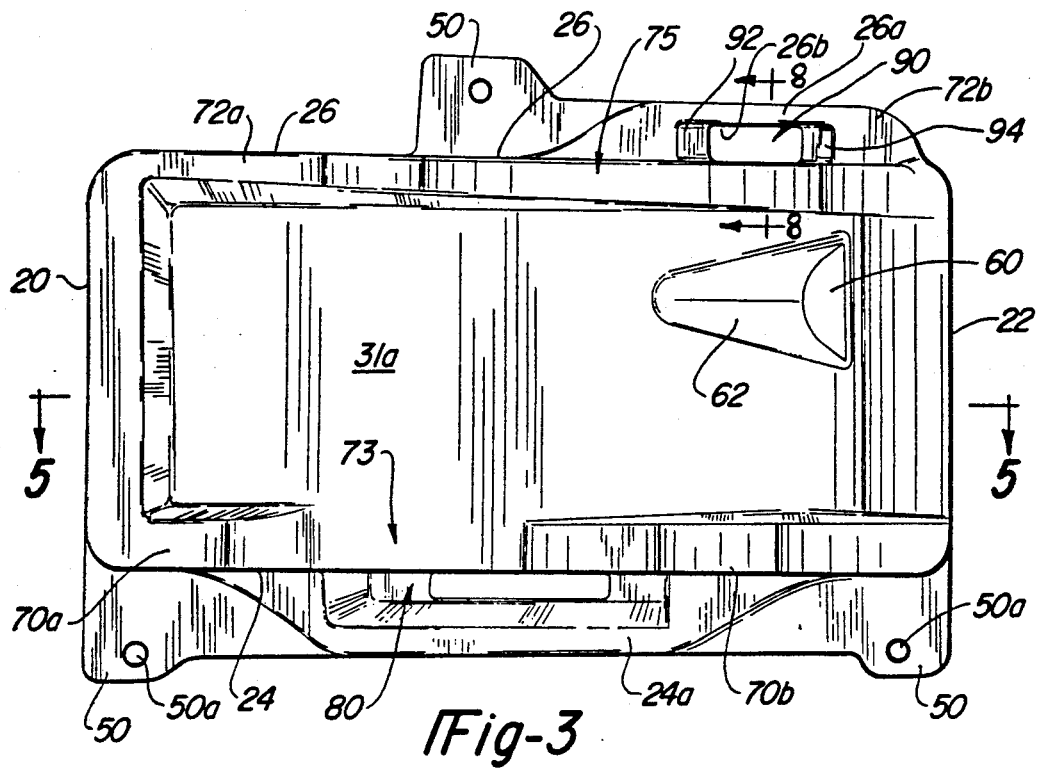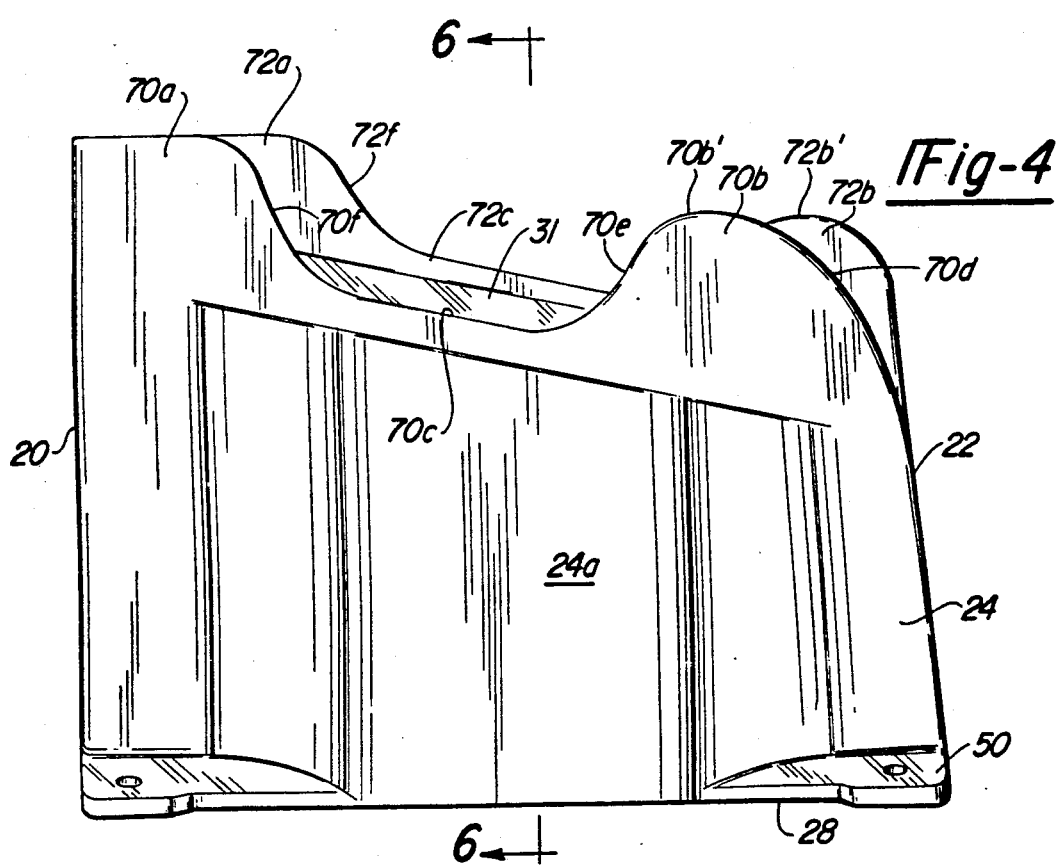

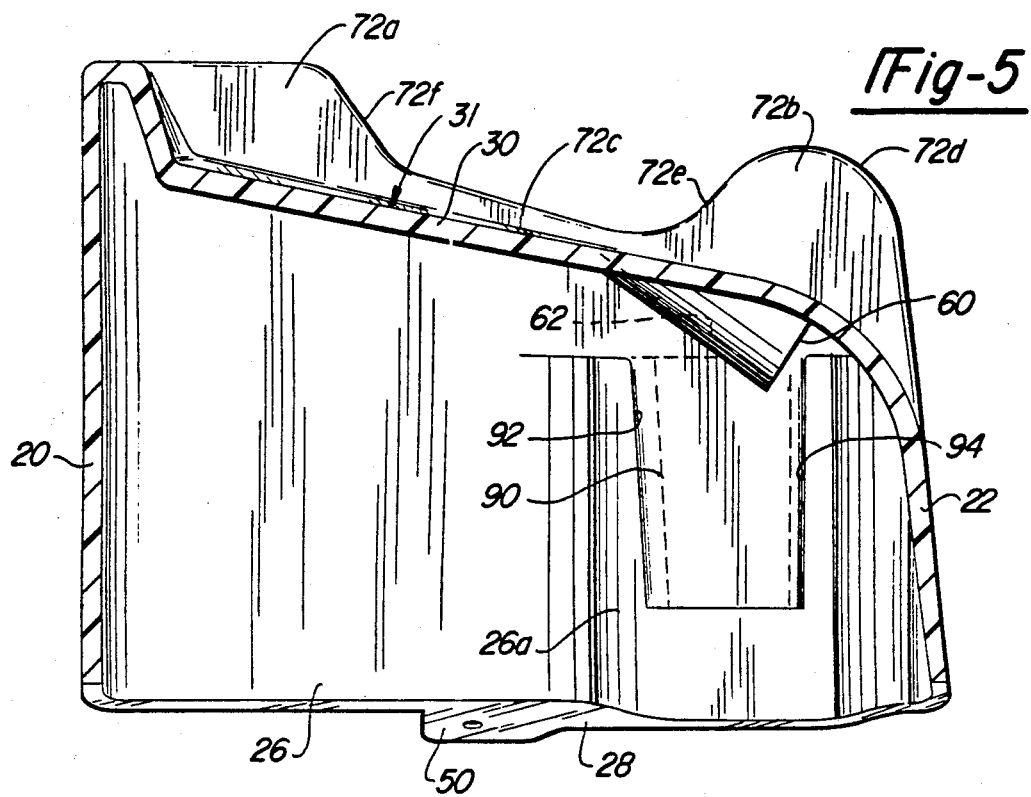
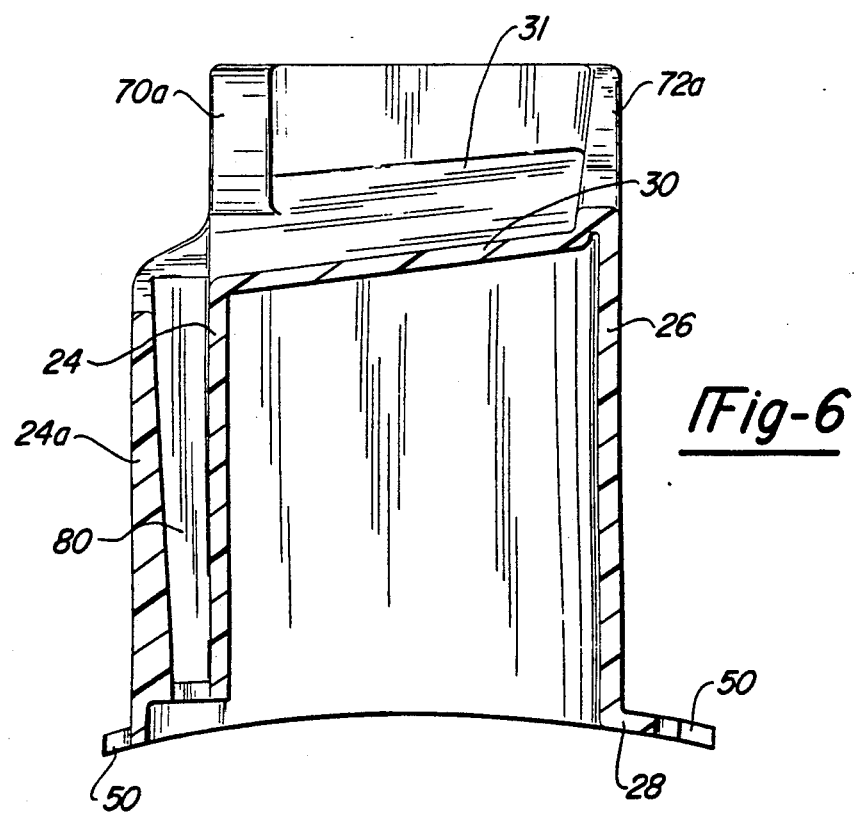

MOBILE TELEPHONE CONSOLE

FIELD OF THE INVENTION

This invention relates to mobile telephone consoles for use in motor vehicles.

BACKGROUND OF THE INVENTION

Portable and permanent consoles mountable on the floor; e.g., the transmission hump, of motor vehicles are known in the art. These consoles have been adapted for various uses such as tables, armrests, storage compartments, mountings for radios, and the like as illustrated, for example, in U.S. Pat. Nos. 3,136,461 issued June 9, 1964; 3,163,287 issued Dec. 29, 1964; 3,311,276 issued Mar. 28, 1967; 3,356,409 issued Dec. 5, 1967; 3,561,589 issued Feb. 9, 1971; 3,804,233 issued Apr. 16, 1974 and 4,061,971 issued Dec. 6, 1971.

Mobile telephones for use in motor vehicles have been mounted by brackets from the dashboard or the floor of the vehicle. U.S. Pat. No. 4,611,734 issued Sept. 16, 1986, illustrates one approach for mounting a mobile telephone on the floor of the vehicle.

SUMMARY OF THE INVENTION

The present invention contemplates a mobile telephone console for use in a motor vehicle wherein the console includes a console body for resting on the floor of the vehicle (e.g., on the transmission hump) and having an upper surface for receiving the telephone thereon, spaced apart side shoulders extending upwardly relative to the upper surface and forwardly toward a forward end of the upper surface, and spaced apart side access openings disposed forwardly of the side shoulders for providing access to opposite sides of the telephone when it is mounted on the upper surface. The side shoulders have an arcuate profile selected to guide the hand of the user to exposed portions of the telephone adjacent the access openings so that the user can release the telephone and lift it from the telephone cradle without having to remove his eyes from the road.

In one embodiment of the invention, one of the side shoulders extends forwardly to a greater extent than the other of the side shoulders and includes a maximum height portion disposed forwardly of the maximum height portion of the other of the side shoulders to guide the hand of the user to the telephone.

In another embodiment of the invention, the upper surface includes an access opening adjacent the rear end for receiving the power cord of the telephone from beneath the console and a recessed trough extending forwardly of the access opening toward the telephone cradle to receive the power cord.

The present invention also contemplates a mobile telephone console for a motor vehicle having a table assembly disposed on the console body, preferably in removable manner. The table assembly includes an elongate support arm having a lower end disposed on the console body and an upper end having a table platform. The table platform is preferably pivotably connected on the support arm for movement between a deployed position for use and a storage position. The support arm preferably is removably disposed on the console body by a stab joint connection provided by a tapered pocket on the console body and a complementary tapered lower end on the support arm.

BRIEF DESCRIPTION OF THE DRAWINGS

FIG. 3 is a plan view of the telephone console with the table assembly removed.

FIG. 4 is a side elevation of the telephone console of FIG. 3.

FIG. 5 is a longitudinal sectional view taken along lines 5—5 of FIG. 3.

FIG. 6 is a transverse sectional view taken along lines 6—6 of FIG. 4.

DETAILED DESCRIPTION OF THE INVENTION

Figure 1:
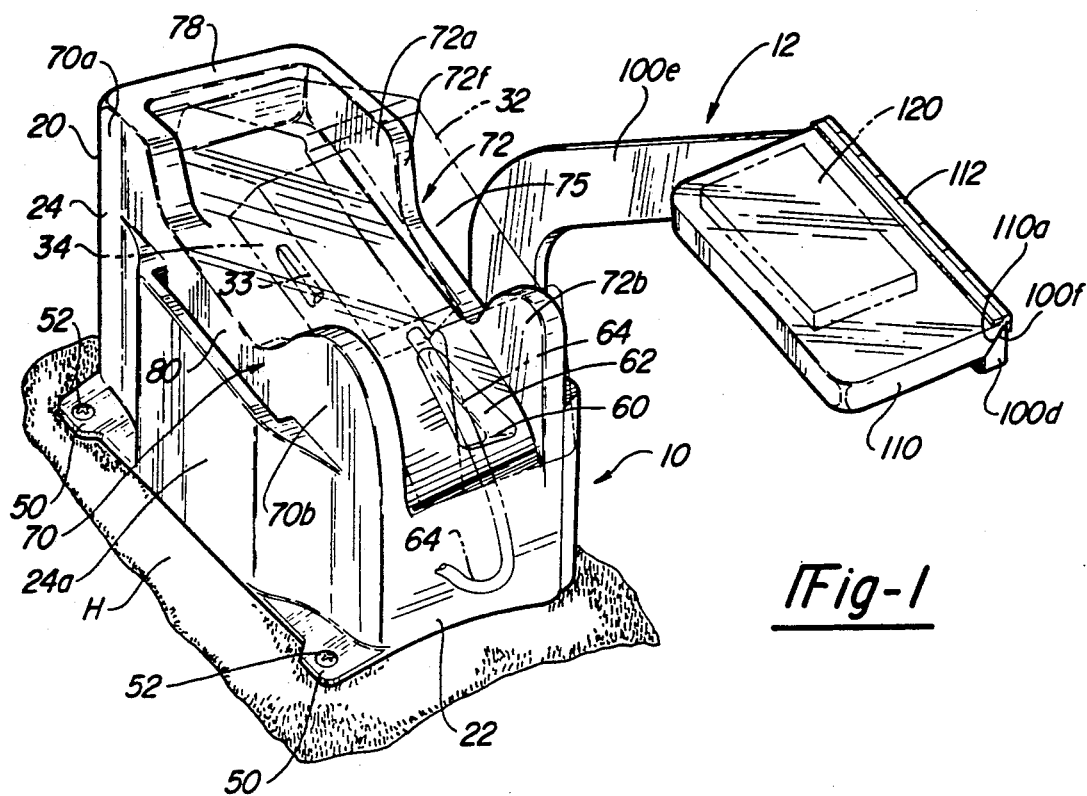
FIG. 1 is a perspective view of a preferred embodiment of the telephone console of the invention.
Figure 2:
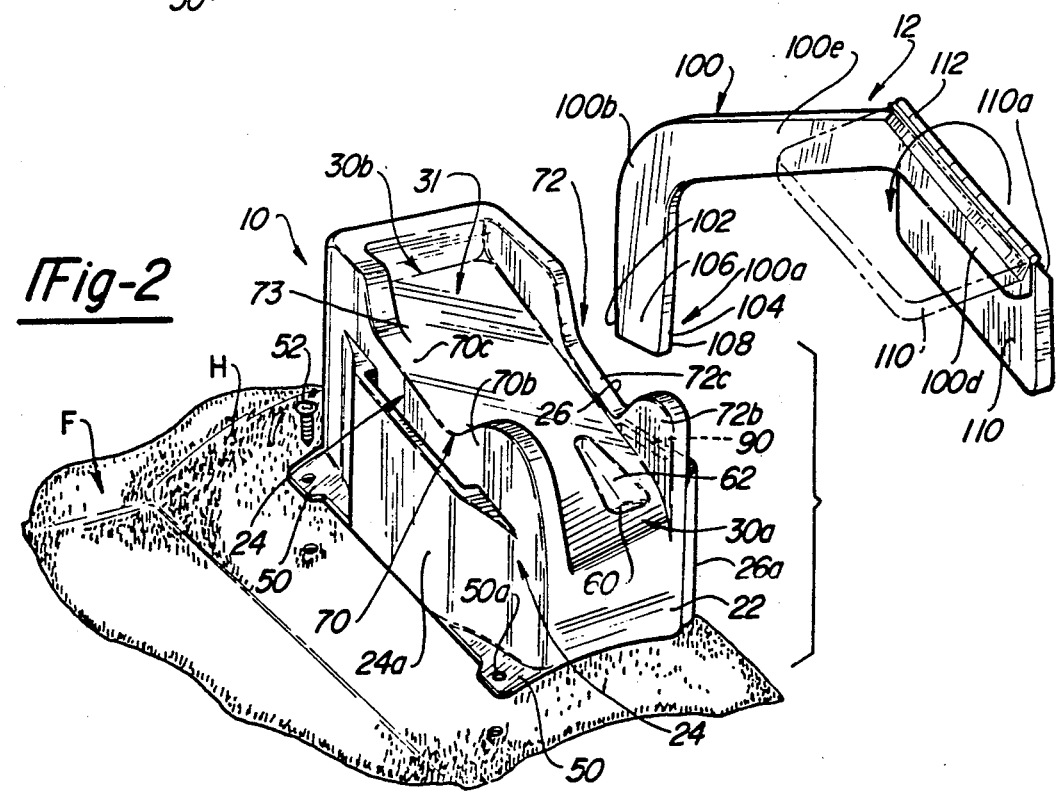
FIG. 2 is an exploded perspective view of the preferred embodiment of FIG. 1.

Referring to FIGS. 1-2, a mobile telephone console 10 in accordance with the invention is shown secured on the floor F, e.g., the carpeted transmission hump H, of a motor vehicle such as an automobile, truck and the like. A writing table assembly 12 is shown releasably attached on the console 10 in FIG. 1 and detached therefrom in FIG. 2.

The hollow console body 10 includes a front wall 20, rear wall 22, side walls 24,26, bottom wall 28 and an upper wall 30 on the upper surface 31 of which the mobile telephone 32 (shown in phantom) and its base or cradle 34 (also shown in phantom) are disposed. The hollow console body 10 preferably is formed of molded ABS structural foam, although other materials such as metal, wood and others can be used to fabricate the console body as a unitary unit or multi-component unit fastened together.

The bottom wall 28 includes bottom flanges 50 each with a hole 50a for receiving a self-tapping screw 52 by which the console body 10 is fastened to the hump H.

As shown best in FIGS. 1-2 and 4-6, the upper wall 30 is inclined upwardly from the rear end 30a toward the front end 30b thereof and also is inclined upwardly from the side wall 24 toward the side wall 26, the side wall 24 being adjacent the driver. The upper wall 30 includes an access opening 60 therethrough and a downwardly recessed trough 62 molded therein and extending forwardly of the access opening 60 toward the cradle 34. A power cord 64 extends from beneath the upper wall 30 through the access opening 60 and along the trough 62 to the cradle 34 of the telephone. As shown in FIG. 1, the telephone 32 hides the power cord 64 from view when the telephone is secured on its cradle 34. Typically, the power cord 64 extends from the dashboard (not shown) beneath the carpet on the floor F or hump H and up through the carpet beneath the console body 10 and through the access opening 60. In this way, the power cord 64 is maintained out of sight.

As shown best in FIGS. 1-2, spaced apart upstanding side shoulders 70,72 are provided on opposite sides of the upper wall 30 to appear contiguous with respective side walls 24,26. Similarly, upstanding front shoulder 78 is molded on the forward end 30b to appear contiguous with front wall 20 of the console body 10. The side shoulders 70,72 include front portions 70a,72a and arcuate rear portions 70b,72b. Front portion 70a and rear portion 70b are gradually blended into an intermediate portion 70c which is substantially coplanar with the upper surface 30 to form a side access opening 73 to the telephone 32 and its cradle 34. Front portion 72a and rear portion 72b are gradually blended into an intermediate, reduced height shoulder 72c to define side access opening 75 to the telephone 32.

The rear portions 70b,72b of the side shoulders 70,72 are provided with arcuate profiles (formed by arcuately sculptured top surfaces) as shown in FIGS. 1-2 and 4-5. The arcuate profile of rear portion 70b extends forwardly to a greater extent relative to rear wall 22 than the rear portion 72b, FIG. 4. The rear portions 70b,72b each include a maximum height portion 70b',72b', FIG. 4, with the maximum height portion 70b' being disposed forwardly of the maximum height portion 72b'. Moreover, the arcuate profile of rear portion 70b includes a generally radiused surface 70d intersecting a steeply downwardly sloping surface portion 70e. Portions 70d,70e are configured to contact and guide the portion of the palm of the hand adjacent the thumb.

The arcuate profile of the rear portion 72b includes sharply curving, radiused surface portion 72d gradually intersecting a steeply downwardly sloping surface portion 72e. Portions 72d,72e are configured to contact and guide the portion of the palm of the hand adjacent the little finger. The forward portion 72a includes a hand limiting rear surface portion 72f displaced rearwardly of a rear surface portion 70f of the forward portion 70. Surface portion 72f is designed to be contacted by the index or other fingers of the user to indicate that the hand is properly positioned to grip the telephone.

The overall effect of the side shoulders 70,72 is to guide the user's hand toward the telephone 32 and its cradle 34. In particular, the thumb of the hand is guided by arcuate rear portion 70b initially to the telephone release member 33 on the cradle 34 and then to the left side of the telephone 32. The remaining fingers are guided by arcuate rear portion 72b to the right side of the telephone 32 to grip and lift it off the cradle 34 once the release member 33 is actuated by the thumb.

Referring to FIGS. 1-4, 6 and 9, the side wall 24 of the console body 10 includes an outwardly extending auxiliary wall 24a molded integrally therewith to form an elongate slot-like upstanding pocket 80 between side wall 24 and auxiliary side wall 24a and configured to provide a receptacle for a pocket size telephone/address book (not shown) and writing instrument such as a pen or pencil (not shown). The pocket 80 is shown best in FIGS. 3 and 6.

Referring to FIGS. 3, 7-8 and 9, the side wall 26 of the console body 10 includes an outwardly extending auxiliary side wall 26a molded integrally therewith to form an elongate slot-like upstanding pocket 90 adjacent the rear wall 28. The pocket 90 includes a front interior wall 92 and rear interior wall 94 which gradually taper toward one another (i.e., converge toward one another) from the top to the bottom thereof. Similarly, the inner side wall 26b of auxiliary side wall tapers toward the side wall 26 (i.e., converges) from the top to the bottom thereof, FIG. 8.

The pocket 90 is configured to releasably receive the lower end 100a of the elongate support arm 100 of the writing table assembly 12 in a stab joint or friction fit type of connection. To this end, the front and rear walls 102,104 of the lower end 100a taper toward one another and the side walls 106,108 also taper toward one another in the downward direction. The taper is selected to provide the desired interference fit to secure the lower end 100a in the pocket 90 with minimal movement thereof when the table assembly 12 is in use as will be explained.

Figure 7:
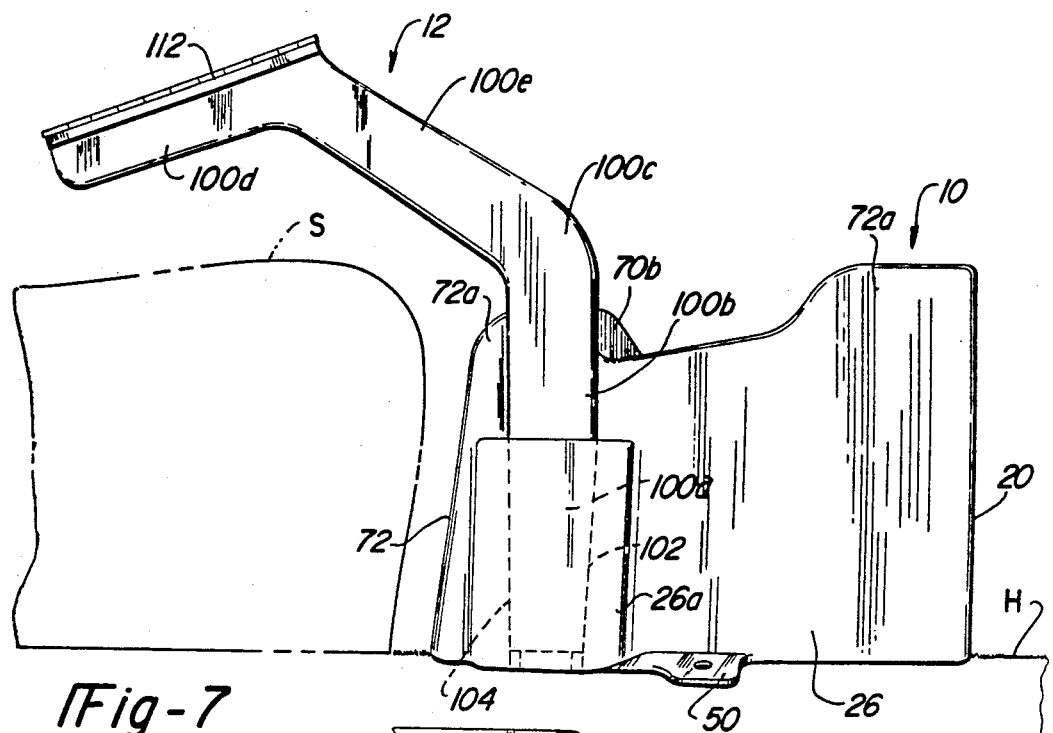
FIG. 7 is a side elevation of the telephone console of FIG. 3.
Figure 8:
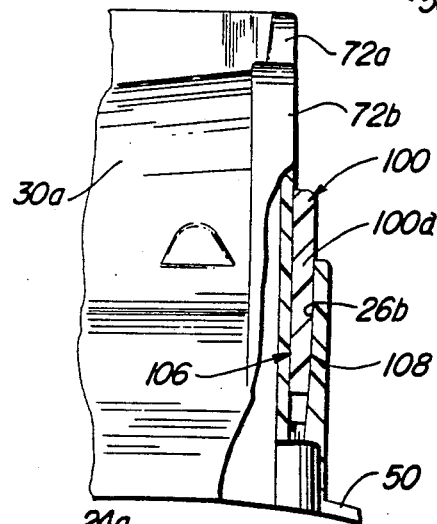
FIG. 8 is a partial cross-sectional view taken along line 8—8 of FIG. 3 with the support arm partially shown.
Figure 9:
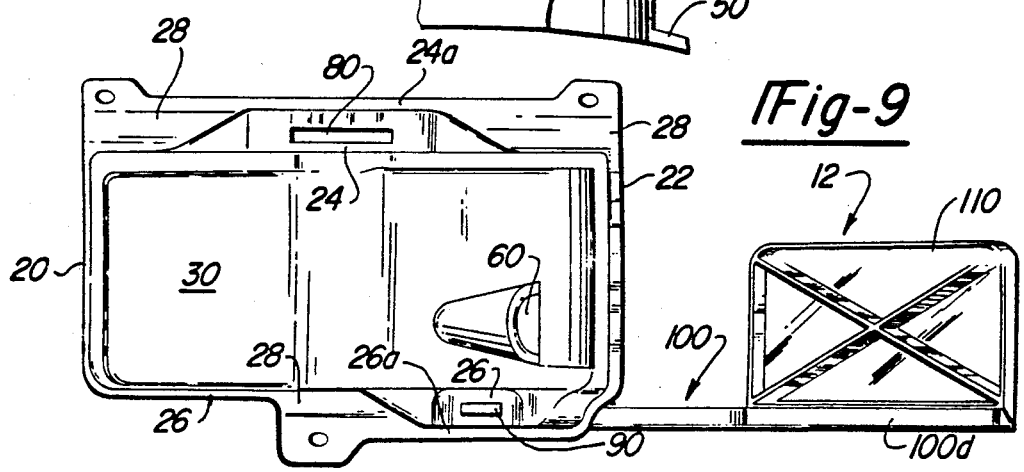
FIG. 9 is a bottom elevational view of the console with table assembly attached

The support arm 100 is elongated upwardly and rearwardly of the console body 10 to position the table platform 110 thereon over the seat S of the motor vehicle, FIG. 7, adjacent the right leg of the driver. To this end, the support arm 100 includes a predominantly upwardly extending portion 100b and upwardly and rearwardly portion 100e interconnected by bend 100c. The portion 100e terminates in an elongate rearwardly extending platform support portion 100d that is inclined downwardly from the front toward the rear thereof, FIGS. 2 and 7.

The table platform 110 is pivotably connected to the support portion 100d by a hinge 112 for movement from a depending position shown in solid in FIG. 2 to a deployed position shown in phantom for use. In the deployed position, a beveled surface 100f on the support portion 100d engages a beveled surface 110a on the table platform 110 to support the table platform 110 in desired writing orientation and against downward forces exerted on the table platform when the user writes on a note pad 120 (shown in phantom) adhered on the table platform.

The support arm 100 is provided with a generally rectangular cross-section having the major dimension (width dimension) oriented to provide maximum vertical support of the table platform 110 against downward forces exerted by writing on the pad 120.

The mobile telephone console 10 can be used with or without the writing table assembly attached thereon. If the driver desires to use the table assembly 12, he simply inserts the end 100a of the support arm 100 in the pocket 90 and pivots the table platform 110 to the writing orientation shown in FIG. 1. If the driver desires to remove the table assembly 12, he simply pulls the end 100a of the support arm 100 out of pocket 90 and folds the table platform 110 to the storage position shown in solid in FIG. 2 or to another alternative storage position coplanar with the support arm 100 (i.e., vertically in FIG. 2) and places the table assembly 12 on or under the seat S.

The invention thus provides a versatile mobile telephone console 10 for a motor vehicle for storing the telephone 32 on its cradle 34 when not in use and for guiding the hand of the user (driver) to release and lift the telephone 32 from its cradle 34 for use. The power cord 64 is hidden from view when the telephone 32 is stored without interfering with nesting of the telephone on its cradle. Moreover, the invention provides a mobile telephone console 10 to which the writing table assembly 12 can be removably and easily attached by the driver to provide a writing platform within convenient reach above the seat. The table assembly is removable and storable when not in use.

Although the table assembly 12 has been described hereinabove as releasably connected to the console 10, those skilled in the art will appreciate that the table assembly 12 may be permanently attached to the console 10 if desired.

While the invention has been described in terms of specific embodiments thereof, it is not intended to be limited thereto but rather only to the extent set forth hereafter in the appended claims.

I claim:

1. A mobile telephone console for a motor vehicle having a floor, comprising a console body for resting on the floor and having (a) an upper surface for receiving a telephone thereon and having a forward end and rear end, (b) spaced apart side shoulders adjacent the rear end, said side shoulders extending upwardly relative to the upper surface and forwardly toward the forward end, one of said shoulders extending forwardly to a greater extent than the other of the shoulders, and (c) spaced apart side access openings disposed forwardly of said side shoulders for providing access to opposite sides of the telephone when it is disposed on said upper surface, said side shoulders having an arcuate profile configured to guide the hand of the user to the opposite sides of the telephone exposed adjacent the side access openings.

2. The telephone console of claim 1 wherein each shoulder has a maximum height portion along the arcuate profile, the maximum height portion of one of the shoulders being disposed forwardly of the maximum height portion of the other of the shoulders.

3. The telephone console of claim 1 wherein the upper surface is inclined upwardly from the rear end toward the front end.

4. The telephone console of claim 3 wherein the upper surface is inclined from one of the shoulders toward the other of the shoulders.

5. The telephone console of claim 1 wherein the upper surface includes an access opening for receiving a power cord of the telephone from beneath the upper surface.

6. The telephone console of claim 5 wherein access opening is adjacent the rear end.

7. The telephone console of claim 6 wherein the upper surface includes a recessed trough therein extending forwardly of the access opening to receive the power cord.

8. A mobile telephone console for a motor vehicle having a floor, comprising a console body for resting on the floor and having (a) an upper surface for receiving a telephone thereon and having a forward end and rear end, (b) spaced apart side shoulders adjacent the rear end, said side shoulders extending upwardly relative to the upper surface and forwardly toward the forward end, and (c) spaced apart side access openings disposed forwardly of said side shoulders for providing access to opposite sides of the telephone when it is disposed on said upper surface, said side shoulders having an arcuate profile configured to guide the hand of the user to the opposite sides of the telephone exposed adjacent the side access openings, said console body further having an upstanding sidewall adjacent one of said shoulders, said side wall having an upstanding pocket forming a tapered recess that converges from the top toward the bottom thereof, said pocket adapted to receive a tapered end of a support arm of a table assembly.

9. The telephone console of claim 8 wherein the pocket includes an interior front wall and an interior rear wall converging from the top to the bottom thereof.

10. The telephone console of claim 9 wherein the pocket includes an interior side wall that converge toward an opposite side wall from the top toward the bottom thereof.

11. A mobile telephone console for a motor vehicle having a floor and a seat, comprising: a console body for resting on the floor in front of the seat, said body having an upper surface for receiving a telephone thereon, a pocket and a table assembly, said table assembly including (a) an upwardly extending elongate support arm having a lower end releasably received in the pocket in stab joint interference manner and (b) a writing table platform disposed on the elongate arm, said table assembly being removable from the console body for storage when not in use.

12. The telephone console of claim 11 wherein the elongate arm extends upwardly and rearwardly of the console body to support the writing table platform over the seat in such a position that a driver of the vehicle can use the writing table platform.

13. The telephone console of claim 12 wherein the pocket forms a tapered recess and the lower end includes a tapered profile.

14. The telephone console of claim 13 wherein the pocket includes an interior front wall and an interior rear wall converging toward one another from the top to the bottom thereof.

15. The telephone console of claim 14 wherein the pocket includes an interior side wall that converges toward an opposite side wall from the top toward the bottom thereof.

16. A mobile telephone console for a motor vehicle having a floor and a seat, comprising:
a console body for resting on the floor in front of the seat, said body having an upper surface for receiving a telephone thereon, an upstanding sidewall having a pocket in the shape of a generally rectangular slot and a table assembly, said table assembly including (a) an upwardly extending elongated support arm having a lower end releasably received in the pocket in stab joint interference manner and (b) a writing table platform disposed on the elongate arm, said table assembly being removable from the console body for storage when not in use.

17. The telephone console of claim 15 wherein the support arm includes a generally rectangular cross-section adapted to be received in the slot.

18. The telephone console of claim 17 wherein the table platform extends substantially perpendicular to the support arm.

19. The telephone console of claim 11 wherein the table platform is pivotably connected to the support arm for movement between a deployed position for use and a storage position.

20. The telephone console of claim 19 wherein the table platform and support arm include complementary beveled surfaces whereby the beveled surface of the table platform is supported on the beveled surface of the support arm when the table platform is deployed for use.

21. The telephone console of claim 19 wherein the table platform is generally parallel with the support arm in the storage position and substantially perpendicular to the support arm in the deployed position.

22. The telephone console of claim 11 wherein the upper surface includes an access opening for receiving a power cord of the telephone from beneath the upper surface.

23. The telephone console of claim 22 wherein the access opening is adjacent the rear of the console body.

24. The telephone console of claim 23 wherein the upper surface includes a recessed trough therein extending forwardly of the access opening to receive the power cord.

25. The telephone console of claim 11 wherein the console body includes arcuate spaced apart first and second side shoulders extending above the upper surface adjacent the rear thereof and extending forwardly to spaced apart side access openings providing access to the telephone.

26. The telephone console of claim 25 wherein the arcuate first and second side shoulders are configured to guide the hand of the user to the portions of the telephone exposed adjacent the side access openings.

27. The telephone console of claim 25 wherein one of the first and second shoulders extends forwardly to a greater extent than the other of the first and second shoulders.

28. The telephone console of claim 27 wherein each shoulder has a maximum height portion along the arcuate profile, the maximum height portion of one of the first and second shoulders being disposed forwardly of the maximum height portion of the first and second other of the shoulders.

29. The telephone console of claim 11 wherein the upper surface is inclined upwardly from the rear end toward the front end of the console body.

30. The telephone console of claim 11 including a writing pad disposed on the writing table platform.

31. A mobile telephone console for a motor vehicle having a floor and a seat, comprising:
a console body for resting on the floor in front of the seat, said body having an upper surface for receiving the telephone thereon, an upstanding pocket defining a tapered recess and a table assembly disposed on said body, said table assembly including an upwardly extending elongate support arm having a tapered lower end releasably received in stab joint manner in said recess and including a table platform proximate an upper end of said support arm.

32. The telephone console of claim 31 wherein the pocket includes an interior front wall and an interior rear wall converging toward one another from the top to the bottom thereof.

33. The telephone console of claim 32 wherein the pocket includes an interior side wall that converges toward an opposite side wall from the top toward the bottom thereof.

34. A mobile telephone console for a motor vehicle having a floor and a seat, comprising:
a console body for resting on the floor in front of the seat, said body having an upper surface for receiving the telephone thereon, an upstanding side wall, a pocket disposed on the upstanding side wall and having a generally rectangular, upright slot therein and a table assembly disposed on said body, said table assembly including an upwardly extending elongate support arm having a lower end of generally rectangular cross-section received in said slot and including a table platform proximate an upper end of said support arm.

35. The telephone console of claim 34 wherein the table platform extends substantially perpendicular to the support arm.

36. A mobile telephone console for a motor vehicle having a floor and a seat, comprising:
a console body for resting on the floor in front of the seat, said body having an upper surface for receiving the telephone thereon and a table assembly, said table assembly including an upwardly extending elongate support arm removably received on the console body and a writing table platform disposed on the elongate arm, said table assembly being removable from the console body for storage when not in use, said console body including spaced apart first and second arcuate side shoulders extending above the upper surface adjacent the rear thereof and forwardly to spaced apart side access openings providing access to the telephone, said arcuate side shoulders being configured to guide the hand of the user to the portions of the telephone exposed adjacent the side access openings with one of said first and second side shoulders extending forwardly to a greater extent than the other of the first and second side shoulders.

37. The telephone console of claim 36 wherein each shoulder has a maximum height portion along its arcuate length, the maximum height portion of one of the first and second shoulders being disposed forwardly of the maximum height portion of the other of the first and second shoulders.

38. A mobile telephone console for a motor vehicle having a floor, comprising a console body for resting on the floor and having (a) an upper surface for receiving a telephone thereon and having a forward end and rear end, said upper surface including an access opening adjacent the rear end for receiving a power cord of the telephone from beneath the upper surface, (b) spaced apart side shoulders adjacent the rear end, said side shoulders extending upwardly relative to the upper surface and forwardly toward the forward end, and (c) spaced apart side access openings disposed forwardly of said side shoulders for providing access to opposite sides of the telephone when it is disposed on said upper surface, said side shoulders having an arcuate profile configured to guide the hand of the user to the opposite sides of the telephone exposed adjacent the side access openings.

39. The telephone console of claim 38 wherein the upper surface includes a recessed trough therein extending forwardly of the access opening to receive the power cord.

* * * * *